United States Patent Office 3,459,306
Patented Aug. 5, 1969

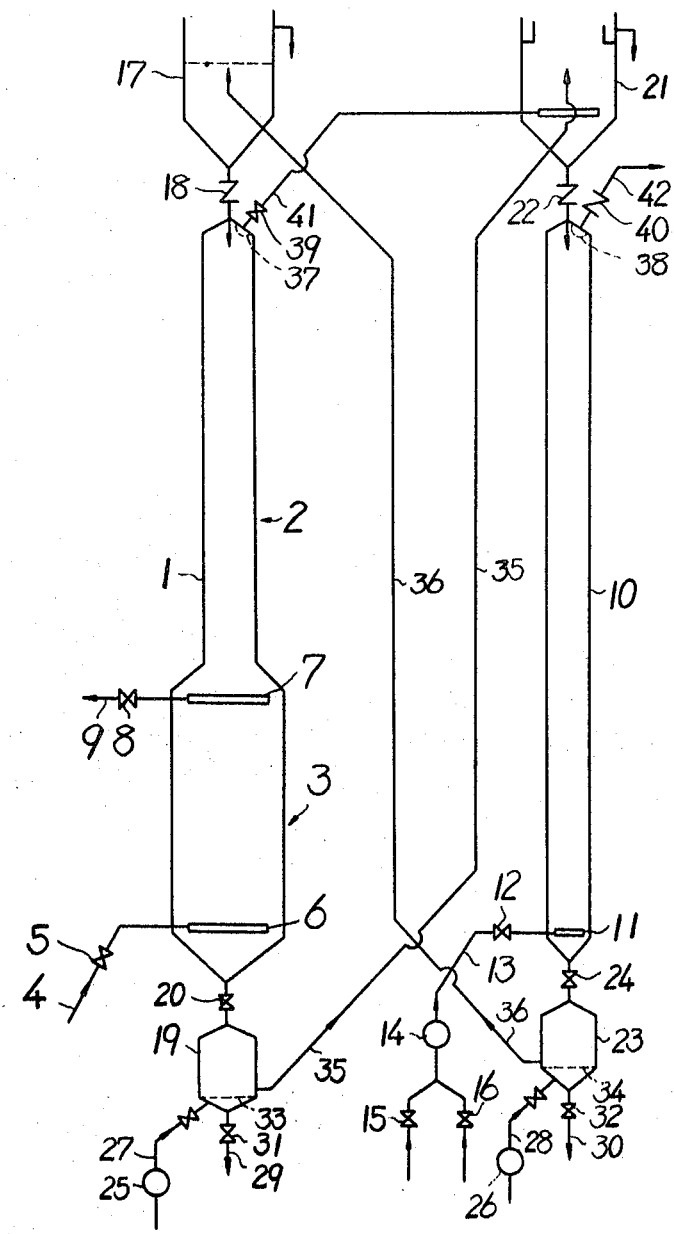

3,459,306
CONTINUOUS ION EXCHANGE APPARATUS
Koichi Kanamori, Ota-ku, Tokyo-to, and Iwao Seto, Chigasaki-shi, Japan, assignors to Ebara Infilco Kabushiki Kaisha
Filed Apr. 12, 1965, Ser. No. 447,465
Claims priority, application Japan, Apr. 18, 1964, 39/21,860
Int. Cl. B01d 23/10
U.S. Cl. 210—189                                                         1 Claim

ABSTRACT OF THE DISCLOSURE

An apparatus for effecting continuous ion exchange is disclosed wherein the movement of the resins involved in the ion exchange is smoothly effectuated and the treated liquid is stabilized without varying the volume rate of flow thereof.

---

Treatments involving continuous ion exchange has several economical advantages, for example cost of operation becomes cheap due to the high efficiency of regeneration and also the expenditure of installation becomes inexpensive because the ion exchange resins utilized involve a quantity smaller than that of the fixed bed system of the apparatus and procedures of the past.

However, these designs of such apparatus are not practical, because the mechanism of the apparatuses becomes complex, and the unstability and loss of the transport of resins involved were considerable.

The present invention relates to a continuous ion exchange apparatus, whose operation is such that the movement of the resins can be made smooth and simultaneously the stabilization of the treated liquid is effectuated without varying the volume rate of flow, and thus provides a sufficiently commercially effective result, the procedures herein defined serving to eliminate the disadvantages above referred.

The device of this invention is a continuous ion exchange apparatus characterized in that there are connected an inlet tube for conduction and introduction of the liquid to be treated, installed in the lower part of the adsorption part or zone of an adsorbing-washing tower wherein the said adsorbing-washing tower is constructed so that the upper part thereof becomes the washing zone for effecting the washing of the regenerated ion exchange resins and the lower part thereof becomes the ion exchange of the feed liquid takes place. An outlet tube for the effluence of the treated liquid is provided in the upper part of the said adsorption zone of the adsorption-washing tower a regeneration tower is provided for effecting the regeneration of the exhausted ion exchange resins in the lower part thereof with a tube for conducting said introducing the regeneration liquid and the substitution liquid from the said adsorbing and washing tower. The upper ends of these adsorbing and washing towers and the regenerating tower are coupled through hoppers which are respectively provided at the upper portions of each tower and which serve also for saving the resins. The lower ends of said both towers are coupled through resin-receiving vessels provided respectively below each tower each with respective valves, the respective tubes for conducting and introducing liquid being connected with each of said resin receiving vessels exclusively for the transportation of the resins, each resin receiving vessel being coupled with the said hopper of the other tower by a conduction tube; liquid exhausting tubes are connected with the upper part of said adsorbing-washing tower and regenerating tower.

The drawing is an explicative diagram showing an example of the present invention.

Now, an example of the present invention is explained with reference to the drawing as follows.

1 is the adsorbing and washing tower, the upper part of the said tower serving as the washing part 2 wherein the regenerated ion exchange resins are washed and the lower part of the said tower serving as the adsorbing part 3 wherein the ion exchange of the feed liquid is effectuated, the inlet tube for conducting and introducing the feed liquid 4 is connected with the lower part of the adsorbing part 3 through the flow control valve 5 joined with the distributor 6. The feed liquid from the inlet tube is conducted and introduced through flow control valve 5 into the lower zone of the adsorption-washing tower 1 from the distributor 6. At the upper part of the adsorbing part 3 the collector 7 is provided, and the outlet tube for the effluence of the treated liquid 9 having the flow control valve 8 is connected therewith.

The regenerating tower 10 for effecting the regeneration of the spent ion exchange resins, after the completion of the absorption, is provided separately from the adsorbing and washing tower 1, with the lower part thereof being connected with an inlet tube 13 for conducting and introducing the regeneration liquid and the substitution liquid B, said flow control valve 12 joined with the distributor 11. This tube 13 for conducting and introducing the regeneration and substitution liquids B and C is further joined with the sources of feed liquids, the said regeneration and substitution liquids being introduced through the pump 14 and through the respective valves 15 and 16. In the event the conduction and introduction tube 13 is directly connected with the valves 15 and 16, the same may be joined with the supplying source of the pressure of the regeneration liquid and the substitution liquid, the pump 14 being omitted in this case.

The upper end of the adsorbing and washing tower 1 is coupled with the hopper 17 through the check valve 18, disposed above the said tower 1. The lower end of the hopper 17 is coupled through the tower 1, the resin-receiving vessel 19, and the valve 20 both being provided below the said tower. Also the upper end of the regenerating tower 10 is coupled with the hopper 21 and the check valve 22 provided thereabove and the lower end of the regeneration tower 1 is coupled to the resin-receiving vessel 23 and the valve 24.

Each of the resin receiving vessels 19 and 23 are connected with tubes 27 and 28 conducting and introducing liquid and exclusively fore the transportation of resins through the respective pumps 25 and 26. The lower end of each of said resin receiving vessels 19 and 23 the liquid drain tubes 29 and 30 are joined through the respective valves 31 and 32; and at the middle of each vessel there are provided perforated plates 33 and 34, so that therethrough the liquid covering the opening parts of said tubes passes, while the resins do not pass. Further, the resin-receiving vessel 19 is coupled with the hopper 21 over the regenerating tower by the conduction tube 35 and the resin-receiving vessel 23 is coupled with the hopper 17 over the adsorbing-washing tower by the conduction tube 36.

The upper part of the adsorbing-washing tower 1 and the regenerating tower 10 are respectively connected by the liquid outlet tubes 41 and 42 having the check valves 39 and 40 covered by the perforated plates 37 and 38 through which the liquid covering the opening part of the towers passes and the resins do not pass, and these putlet tubes are conducted out of the towers 1 and 10; but the liquid outlet tube 41 connected to the adsorbing and washing tower 1 additionally operate for the re-use of the waste liquid by conducting the same from the liquid outlet tube 41 into the hopper 21 of the regenerating tower 10, as shown in the example.

Now, according to the above structure, the feed liquid is contacted and adsorbed while it passes upwardly from the inlet distributor 6 through the control valve 5, then flows out from the outlet tube 9 as treated liquid through the outlet collector 7 and control valve 8, and the resin filled in the adsorption part 3 is maintained in the bed shape like as a fixed bed. At this time, the effluent of the treated liquid is suitably controlled by the valve flow control valve 8, and one part of said treated liquid without flowing out rises further into the tower 1, rinsing the regenerated resins off into the washing part 2 and passes through the perforated plate 37, and thereafter passes also through the check valve 39, as a washing waste liquid, and is exhausted from the tower 1 from the liquid outlet tube 41. During this time the liquid for exclusive use of transporting the resins is transmitted and introduced in the resin-receiving vessel 19 by means of the pump 25 leading from the tube and introducing and conducting the liquid for exclusive use of transporting the resins 27, and the exhausted resins, which are saved, the same passing through the conduction tube 35 and being transported to the hopper 21 of the regenerating tower 10.

When the said operations are effected during a fixed time, the resins of into the adsorption part 3 gradually lose their adsorption capacity from below while the resins of the washing part 2 are gradually washed from below sufficiently. After the predetermined period of time the feed liquid for ion exchange and the liquid for exclusive use of transporting the resins are stopped and the valves 20 and 31 are opened, the regenerated resins, that were transported through the conduction tube 36 from the resin-receiving vessel 23 of the regenerating tower 10 into the hopper 17, now flow down to washing part 2 of the adsorbing-washing tower 1 by gravity, and simultaneously the spent resins at the lower part in the adsorption tower 3 that have the same volume as that of said resins, allowed to flow into the resin-receiving vessel 19, the liquid, after passing through the perforated plate 33 and through the valve 31, being discharged out of the tower 1 from the liquid drain tube 29. When the transportation of the regenerated and washed resins of the lower part of the washing part 2 to the upper part off into the adsorption part 3 and the transportation of the exhausted resins simultaneously to the resin-receiving vessel 19 are completed, the valves 20 and 31 are closed, the feed liquid passes through the inlet tube 4 and the liquid for exclusive use of transporting the resins are manipulated, and thus the operations of ion exchange of said feed liquid, and transport of the exhausted resins to the hopper 21 of the regenerating tower 10 are repeated.

Also in the regenerating tower 10, the regeneration liquid passes through the valve 15 and is conducted from the conduction tube 13 by means of the pump 14, the regeneration liquid thus flowing into the tower through the distributor 11 while the volume rate flow by the control valve 12, is maintained at constricted volume, thereby regenerating the resins in the tower, and from the check valve 40 and the waste liquid tube 42. After the introduction of the regeneration liquid of predetermined volume the valve 15 is closed, and simultaneously the valve 16 introducing the substitution liquid is opened, so that the previously introduced regeneration liquid is transported into the tower 10 from the lower part of the resins vessel to flow in the upper direction, and is substituted by the substitution liquid. During this time, the liquid for exclusive use of transporting the resins is transferred and introduced by the pump 26 into the resin-receiving vessel 23 from the liquid-conducting-introducing tube 28 for exclusive use of transporting the resins connected with the resin receiving vessel 23, and the regenerated resins off into the tower are transported to the hopper 17 of the adsorbing-washing tower 1 through the conduction tube 36. After, the passing of the fixed time, the flow of the substitution liquid is stopped, the valves 24 and 32 are open and down-flow of the resins by gravity is similarly effectuated as in said adsorbing-washing tower.

The respective operations are repeated by the adsorbing-washing-tower 1 and the regenerating tower 10 exhibit their respective functions and the transportation of the resins is operated into the both towers, ion exchange treatment being continuously effected. The operations, repeated can be automatically carried out by effecting starting-stopping of the pumps and opening-closing of all the valves by a cyclic time schedule.

Now, when the outlet tube 41 connected with the upper part of the adsorbing-washing tower 1, is conducted to the hopper 21 of the regenerating tower 10, as in the shown example, the pulverized resins of the transported and exhausted resins, an dundesired stances conglutinated during the adsorption and the like are removed by the washing waste liquid being exhausted from the adsorbing-washing-tower, into the hopper 21.

In said regenerating tower 10, further the process is effectuated as followers. That is, for example, in the step of liquid passing into the regenerating tower 10, when a regeneration liquid comparatively concentrated passes in a small amount, in order to utilize profitably the regeneration liquid without effecting useless exhausting of unreacted regeneration liquid and in order to prevent the said regeneration liquid, accompanied by the resins, from exhausting, the regeneration liquid introduced in the lower part of the regenerating tower 10, is first passed through opening the valve 15, the said valve 15 for passing liquid of fixed amount is closed, then the valve 16 is opened, and thereby the substitution liquid passes; and again after the completion of passing liquid of fixed amount, the pump 14 and the pump 26 of liquid for exclusive use of transporting the resins are stopped, the valves 24 and 32 are opened, thereby only the lower part of the resins layer, acted upon by the substitution liquid in the regenerating tower 10, is transported into the resin-receiving vessel 23, with the exhausting of unreacted regeneration liquid, accompanied by resins, being prevented. These operations also can be automatically carried out by cyclic time.

According to the present invention, the apparatus for continuous ion exchange is a device wherein a tube for the effluence of the treated liquid at the upper part of the adsorption part and a tube for conducting and introducing the feed liquid at the lower part of the adsorption part of an adsorbing washing tower, in which the upper part is made to be the washing part for operating the washing of the regenerated ion exchange resins and the lower part is made to be the adsorption part for effecting ion exchange of the feed liquid, are connected; a regenerating tower for carrying out the regeneration of the exhausted ion exchange resins, connected to the tubes for regeneration liquid and for conducting-introducing substitution liquid is provided separately from the said adsorbing-washing tower; the upper ends of these adsorbing-washing tower and regenerating tower being coupled through respective hoppers and valves provided above each tower and serving also for saving the resins, the lower ends of each tower being coupled through respective resin-receiving vessels and valves provided under each tower; each of the said resin-receiving vessels being connected with respective liquid-conducting-introducing tubes for exclusive use of transporting the resins, coupled with each resin-receiving vessel and with the said hopper of the other tower; by connecting the liquid outlet tubes with the upper part of said adsorbing-washing tower and regenerating tower, the adsorption and washing can be jointly operated by the action of a single tower and a washing tower is not necessary to be provided separately because one part of the treated liquid, after passing through the adsorption part in the adsorbing-washing tower, arrives at the washing part and operates the washing of the regenerated resins; and the operations can be conveniently operated and the establishment area can be reduced. Also, as resin-receiving vessels are separately established at the adsorbing-washing tower and the regenerating tower, the treated liquid is stabilized without varying the volume rate of flow and the resins can be transported securely and without mechanical damage of resins to the hoppers of the following tower by means of a very suitable liquid.

Further, when in the regenerating tower a small amount of concentrated regeneration liquid is employed, if the regeneration liquid and the substitution liquid are reciprocally passed, the regeneration liquid can be profitably utilized without transporting the unreacted regeneration liquid accompanied by the resins, because the resins in the amount utilized and functioning the reaction with the substitution liquid are transported to the resin-receiving vessel; which is a great advantage of this invention.

What we claim is:

1. An apparatus for continuous ion exchange and regeneration of ion exchange resins comprising an adsorption-washing tower having an upper zone for washing regenerated ion exchange resins and a lower zone adapted for effecting ion exchange of the ion exchange resins, a separate regeneration tower adapted for effectuating the regeneration of ion exchange resins having upper and lower portions, an inlet valve at the lower zone of said adsorption tower for conducting and introducing a feed liquid to the lower zone of said adsorption tower, an outlet tube located below said upper zone and above said lower zone of said adsorption tower for discharging a portion of the treated feed liquid from said adsorption tower, an outlet at the upper end of the upper zone of said adsorption tower for discharging the remainder of the treated feed liquid, a tube at the bottom portion of said regeneration tower for introducing a regeneration liquid and a substitution liquid into the regeneration tower, a second tube at the upper portion of said regeneration tower for discharging said regeneration liquid and substitution liquid from said regeneration tower, two hoppers for ion exchange resins, one of said hoppers being coupled to the top of the regeneration tower for feeding resin thereto, the other of said hoppers being coupled to the top of upper zone of the adsorption tower for feeding resin thereto, two resin receiving vessels separate from the two towers, one of said vessels being coupled to the bottom of said regeneration tower by valve means, the other of said vessels being coupled to the bottom of said adsorption tower by valve means, a conduction tube connecting said receiving vessel of the adsorption tower to the hopper of said regeneration tower for transporting resin from the resin receiving vessel of the adsorption tower to the hopper of said regeneration tower, a second conduction tube connecting said receiving vessel of the regeneration tower to the hopper of said adsorption tower for conducting resin from the resin receiving vessel of said regeneration tower to the hopper of said adsorption tower.

References Cited
UNITED STATES PATENTS

| | | | |
|---|---|---|---|
| 2,572,848 | 10/1951 | Fitch | 210—33 |
| 2,852,464 | 9/1958 | Nordell | 210—33 |
| 3,152,072 | 10/1964 | Yomiyama et al. | 210—189 X |
| 3,244,561 | 4/1966 | Mihara et al. | 210—33 X |
| 3,311,552 | 3/1967 | Staats | 210—33 |
| 3,378,339 | 4/1968 | Yamashiki | 210—189 X |

REUBEN FRIEDMAN, Primary Examiner

C. DITLOW, Assistant Examiner